(12) United States Patent
Kurita (10) Patent No.: US 7,307,994 B2
(45) Date of Patent: Dec. 11, 2007

(54) CONTROLLER AREA NETWORK (CAN) BASED COMMUNICATION SYSTEM WITH MULTIPLE BUS CONNECTED NODES

(75) Inventor: Hiroshi Kurita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 670 days.

(21) Appl. No.: 10/937,334

(22) Filed: Sep. 10, 2004

(65) Prior Publication Data
US 2005/0089059 A1 Apr. 28, 2005

(30) Foreign Application Priority Data
Oct. 24, 2003 (JP) ............... 2003-364289

(51) Int. Cl.
H04L 12/56 (2006.01)
H04L 12/413 (2006.01)
G06F 15/16 (2006.01)

(52) U.S. Cl. .................. 370/395.3; 370/447; 370/474; 709/235

(58) Field of Classification Search ................ 370/445, 370/447, 461, 395.3, 474–476; 709/231, 709/235, 238
See application file for complete search history.

(56) References Cited

U.S. PATENT DOCUMENTS 5,892,929 A * 4/1999 Welker ....................... 710/107
6,801,942 B1 * 10/2004 Dietrich et al. ............. 709/225

FOREIGN PATENT DOCUMENTS

| JP | A 2001-119416 | 4/2001 |
| JP | A 2002-176427 | 6/2002 |

* cited by examiner

Primary Examiner—Chi Pham
Assistant Examiner—Tri H. Phan
(74) Attorney, Agent, or Firm—Oliff & Berridge, PLC (57) ABSTRACT

A bus communication system capable of determining an order of priorities based on IDs of transmitting nodes is provided. A communication unit writes its own node ID as a transmitting node ID into an arbitration field of a message packet that is to be transmitted from the communication unit to a bus, writes a node ID of a destination node into an auxiliary field defined at a predetermined location in the message packet, and transmits the message packet to the bus. A control unit rewrites the message packet transmitted from the communication unit by replacing the node ID written in the arbitration field with the node ID written in the auxiliary field, and transmits the rewritten message packet to the bus. Another communication unit, or the destination node, receives the message packet existing on the bus based on a match between its own node ID and the node ID indicated in the arbitration field rewritten by the control unit.

13 Claims, 8 Drawing Sheets

| NODE | NODE ID |
|---|---|
| SHEET FEEDER UNIT | 41hex |
| IMAGING UNIT | 21hex |
| CONTROL UNIT | 1Fhex |
| SHEET OUTPUT UNIT | 81hex |
| FINISHER/OUTPUT UNIT | 82hex |

Fig. 9

CONTROLLER AREA NETWORK (CAN) BASED COMMUNICATION SYSTEM WITH MULTIPLE BUS CONNECTED NODES

BACKGROUND OF THE INVENTION

1. Field of the Invention

The present invention relates to a communication system, and in particular to a communication system having bus-connected nodes.

2. Description of the Related Art

Some existing related art systems employ a CAN (Controller Area Network) standard as a serial data bus standard. One of the features of the CAN standard is an arbitration method which is invoked when a collision between message packets occurs. A typical arbitration method as used in the CAN standard will be described below.

Figure 1:
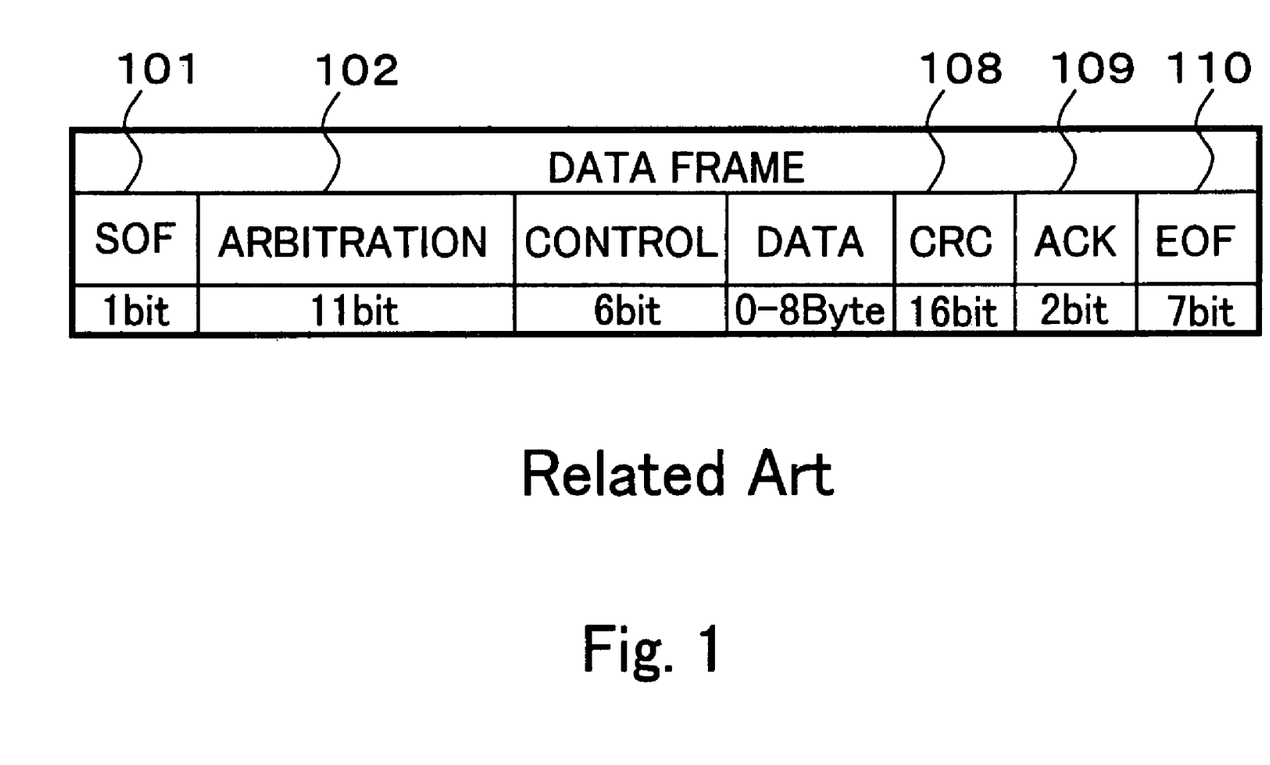
FIG. 1 shows an example of a frame structure of a message packet for use in a related art CAN standard.

Referring to FIG. 1, an exemplary frame structure of a message packet for use in the CAN standard is shown, in which an arbitration field 102 indicates an ID that is uniquely defined for each device. Such an ID as indicated in the arbitration field represents an ID of a destination device to which the message packet is to be sent. Each device determines, based on a comparison between its own ID and the ID indicated in the arbitration field of a message packet flowing along a bus, whether or not the message packet is to be received.

Such IDs indicate priorities of respective devices in a bus system, and are used in an arbitration when a collision between message packets occurs on the bus. The term "arbitration" refers to a decision to select from among colliding message packets a message packet that should remain on the bus. The selected message packet flows through the bus a head of others, while the other message packet(s) not selected in the arbitration will be transmitted again after a predetermined period of time elapses. More specifically, a message packet with the arbitration field indicating an ID with a higher priority wins in the arbitration and flows on the bus ahead of any other message packet.

Such systems and related techniques are described in, for example, Japanese Patent Laid-Open Publication Nos. 2001-119416 and 2002-176427.

As described above, the ID indicated in the arbitration field of a message packet represents a destination device, and indicates a priority of the message packet flowing on the bus. Thus, in the related art CAN standard, a message packet with a higher priority, which is indicated by the ID of a destination device of the message packet, is allowed to flow through the bus ahead of others. On the other hand, when a collision between message packets occurs on the bus in a system operating under the CAN standard, in some cases, it may be preferable to determine an order of priorities based on IDs of devices from which the message packets are transmitted, and to allow a message packet having an ID of a transmitting device indicating a higher priority to flow through the bus ahead of others. However, under the related art CAN standard, because an order of priorities is determined based on destination IDs indicated in the arbitration fields of message packets, there is a problem in that an order of priorities cannot be determined based on IDs of transmitting devices.

SUMMARY OF THE INVENTION

According to one aspect of the present invention, there is provided a communication system comprising a plurality of bus-connected nodes, each node having a unique node ID, wherein, when a collision occurs between message packets transmitted from the nodes, a message packet with an arbitration field indicating a node ID with a highest priority flows through a bus ahead of any other colliding message packet, wherein each of the nodes comprises a transmitting node ID writing unit that writes its own node ID as a transmitting node ID into an arbitration field of a message packet to be transmitted to the bus; a destination node ID writing unit that writes a node ID of a destination node into an auxiliary field defined at a predetermined location in the message packet; a transmitting unit that transmits to the bus the message packet in which the transmitting and destination node IDs are written; a determination unit that determines, based on a comparison between its own node ID and a node ID indicated in an arbitration field of a message packet existing on the bus, whether or not the message packet is to be received; and a receiving unit that receives the message packet if the determination unit determines that the message packet is to be received, wherein the communication system further comprises a control unit comprising: a receiving unit that receives a message packet transmitted from one of the nodes; are writing unit that rewrites the received message packet by replacing a node ID written in the arbitration field with a node ID written in the auxiliary field; and a transmitting unit that transmits the rewritten message packet to the bus.

In such a communication system, a node writes its own node ID as a transmitting node ID into an arbitration field of a message packet to be transmitted to the bus, writes a node ID of a destination node into an auxiliary field defined at a predetermined location in the message packet, and transmits the message packet to the bus. A control unit rewrites the message packet transmitted from the node by replacing the node ID written in the arbitration field with the node ID written in the auxiliary field, and transmits the rewritten message packet to the bus. The destination node receives the message packet existing on the bus based on a match between its own node ID and the node ID indicated in the arbitration field rewritten by the control unit.

Therefore, a message packet having a higher-priority transmitting node ID can reach a destination node ahead of other message packets.

BRIEF DESCRIPTION OF THE DRAWINGS

A preferred embodiment of the present invention will be described in detail based on the following figures, wherein.

DETAILED DESCRIPTION OF THE INVENTION

A preferred embodiment (hereinafter, referred to as an "embodiment") of the present invention will be described with reference to the drawings.

Figure 2A:
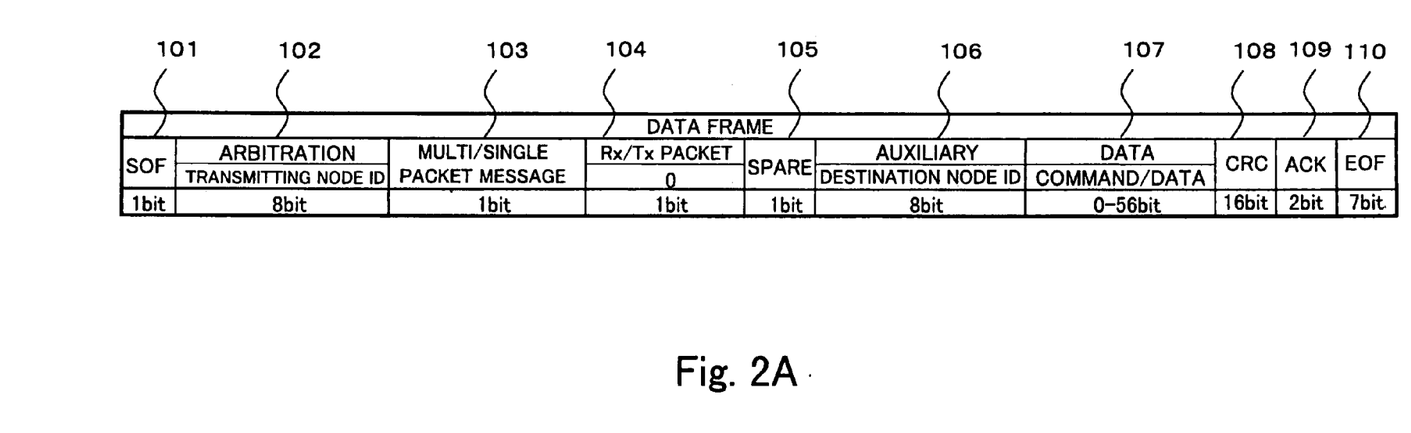
FIG. 2A shows an example of a frame structure of a transmission message packet for use in the preferred embodiment.
Figure 2B:
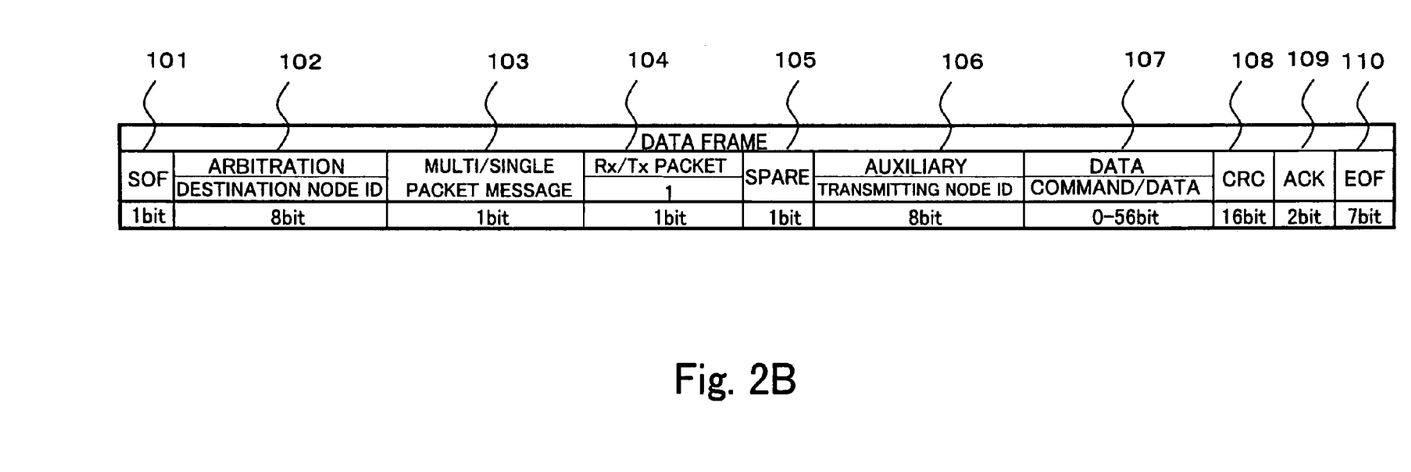
FIG. 2B shows an example of a frame structure of a reception message packet for use in the preferred embodiment.

The present embodiment differs from that of the related art CAN standard in that, as shown in FIG. 2A, an arbitration field of a transmission message packet transmitted to a bus from each of bus-connected nodes does not indicate a node ID of a destination node (destination node ID), but indicates anode ID of a transmitting node (transmitting node ID). Further, the present embodiment differs from that of the related art CAN standard in that a control unit is provided to receive all transmission message packets flowing on the bus, regardless of which node is a destination node of each transmission message packet. The control unit exchanges the transmitting node ID indicated in the arbitration field of the received transmission message packet and the destination node ID to rewrite the arbitration field, and transmits the resultant message packet to the bus in a form of a reception message packet as shown in FIG. 2B. In this embodiment, a node ID is an identifier for identifying each node, and also represents a value for use in determining an order of priorities of bus-connected units.

In CAN-based bus communications (based on, for example, a high-speed CAN (IS011898) or low-speed CAN (IS011519-2)), when a collision between packets coming from multiple units occurs on the bus, a packet to be transmitted to the bus ahead of others is determined based on a comparison of priorities of node IDs indicated in the arbitration fields of the respective packets. Therefore, by indicating a transmitting node ID in the arbitration field of a transmission message packet to be transmitted from each unit, as in the present embodiment, when a collision occurs between packets to be transmitted from multiple units, a packet having a higher-priority transmitting node ID can be transmitted to the bus ahead of others.

However, such a frame structure with the arbitration field indicating a transmitting node ID may cause a problem, as will be described below. In CAN-based bus communications, whether or not each unit should receive a message packet flowing on the bus is determined based on whether or not the node ID indicated in the arbitration field of the message packet flowing on the bus matches the node ID of the unit itself. Therefore, when the arbitration field indicates a transmitting node ID as described above, because the node IDs compared by the destination node do not match each other, simply using such a frame structure results in a problem such that the destination node cannot receive the packet.

In order to solve the above-described problem, according to the present embodiment, the control unit is provided to temporarily receive all message packets in each of which the arbitration field indicates a node ID of a transmitting node. The control unit replaces the node ID indicated in the arbitration field with the destination node ID, thereby enabling the destination node to receive the message packet based on a match between the node ID indicated in the arbitration field and its own node ID.

Next, frame structures of a transmission message packet and a reception message packet will be described in detail with reference to FIGS. 2A and 2B.

FIG. 2A shows a frame structure of a transmission message packet. In this frame structure, an SOF (Start of Frame) 101 is a field for indicating a starting point of one frame, and has a "dominant" bit level (a digital signal of "0"). An arbitration field 102 is a field for indicating a transmitting node ID as already described, and contains 8 bits. A multi/single packet message field 103 is a field for identifying whether the packet message is a multi-packet message or a single-packet message. In this field 103, the bit level for a multi-packet message is "dominant", and the bit level for a single-packet message is "recessive" (a digital signal of "1").

An Rx/Tx packet field 104 is a field for identifying whether the packet is a transmission message packet or a reception message packet. In this field 104, the bit level for a transmission message packet is "dominant". A spare field 105 is an extra field reserved for future use. An auxiliary field 106 containing 8 bits indicates a node ID of a destination node. A command/data field 107 indicates a command or data to be sent to the destination node, and contains 0-56 bits. Furthermore, the transmission message packet includes a CRC field 108 for checking for a frame forward error, an ACK field 109 for acknowledging receipt of the data frame, and an EOF (End of Frame) field 110 for declaring an end of the data frame.

Further, referring to FIG. 2B, a reception message packet to be transmitted from the control unit will be described. The reception message packet has a frame structure similar to that of the transmission message packet, but differs from the transmission message packet in that the node ID indicated in the arbitration field 102 is a destination node ID, in that the node ID indicated in the auxiliary field 106 is a transmitting node ID, and in that the bit level of the Rx/Tx packet field 104 is "recessive".

Figure 3:
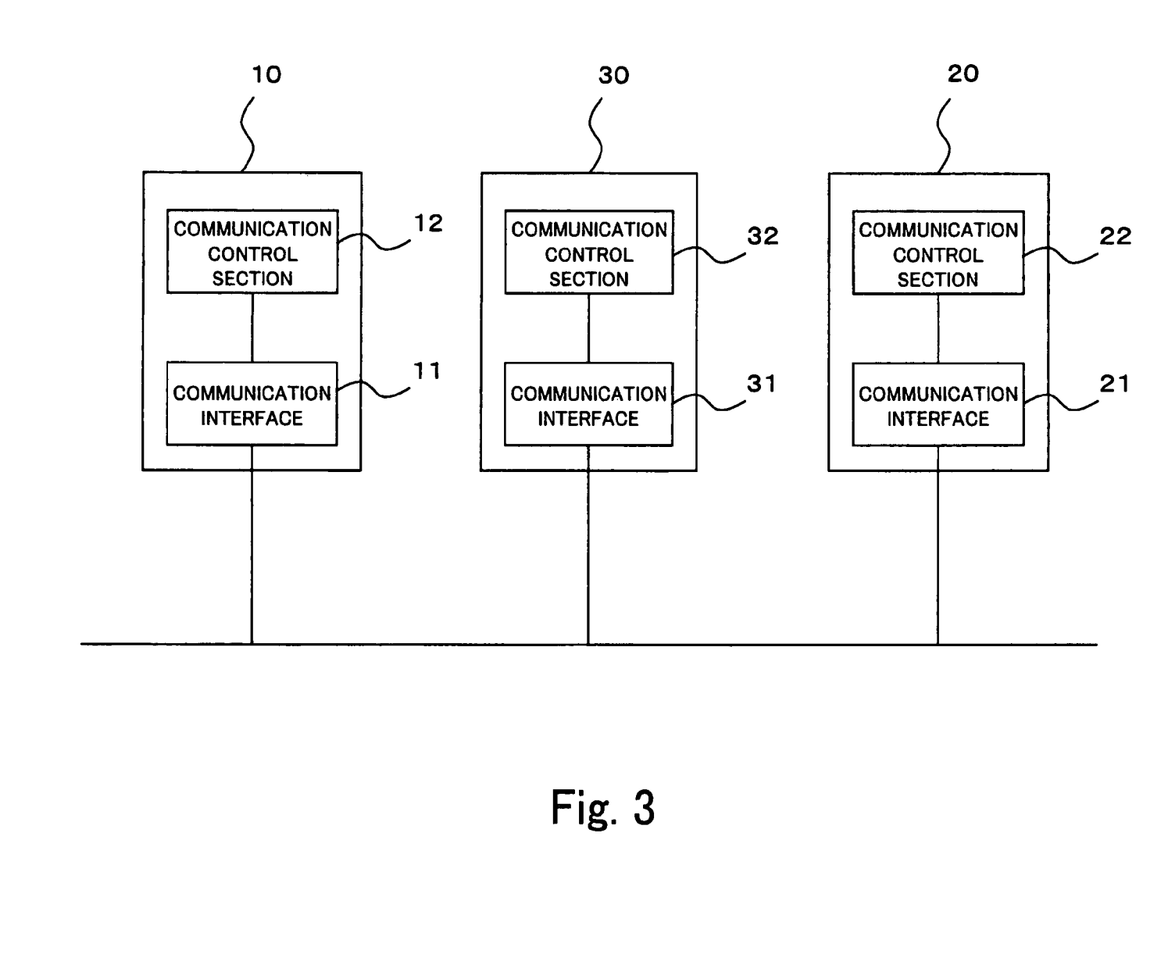
FIG. 3 shows an example of a system structure that includes communication units and a control unit according to the preferred embodiment.

Next, operation of CAN-bus-connected communication and control units will be described with reference to an example of a system structure according to the present embodiment as shown in FIG. 3.

Communication units 10 and 20 are both connected to a CAN bus, and transmit/receive data through communication interfaces 11 and 21, respectively. Communication control sections 12 and 22 control transmission/reception of a message packet, and also control an arbitration for cases where a collision occurs between packets. Each of the communication control sections 12 and 22 includes, for example, a CPU and a memory (such as RAM or ROM), wherein the CPU reads a program stored in the memory to control, for example, transmission/reception of a message packet. As the memory for storing a program, it is possible to use any other recording medium, such as a floppy (registered trademark) disk, a hard disk drive, or a CD-ROM. More specifically, each of the communication control sections 12 and 22 writes its own node ID in the arbitration field of a message packet to be transmitted, writes the destination node ID in the auxiliary field, and generates a transmission message packet as shown in FIG. 2A. The generated transmission message packet is temporarily stored in a buffer of either of the communication interfaces 11 and 21. Then, each of the communication control sections 12 and 22 reads the temporarily stored transmission message packet from the buffer in a FIFO (first in, first out) manner, and transmits the message packet onto the bus.

Simultaneously, each of the communication control sections 12 and 22 operates to detect a collision between packets on the bus, and performs an arbitration. One of the communication control sections 12 and 22 that has won in the arbitration continues to transmit the transmission message packet. On the other hand, the other communication control section 12 or 22 that has lost in the arbitration suspends transmission of the transmission message packet, and waits until the communication control section detects on the bus an EOF field of the message packet that has won in the arbitration. After the EOF field is detected, the communication control section reads the temporarily stored transmission message packet from the buffer in the FIFO manner, and attempts again to transmit the message packet onto the bus. In addition, each of the communication control sections 12 and 22 determines whether or not the node ID indicated in the arbitration field of a reception message packet existing on the bus matches its own node ID. When the node IDs match each other, the reception message packet is received through a corresponding one of the communication interfaces 11 and 21.

The control unit 30 includes a communication interface 31 and a communication control section 32. As in the communication control sections 12 and 22, the communication control section 32 includes, for example, a CPU and a memory (such as RAM or ROM), wherein the CPU reads a program stored in the memory to control, for example, transmission/reception of packets. The communication control section 32 receives, via the communication interface 31, all transmission message packets transmitted from the communication units to the bus, regardless of which node ID of which communication unit is indicated in the arbitration field. Then, the communication control section 32 exchanges the transmitting node ID indicated in the arbitration field of the received transmission message packet and the destination node ID indicated in the auxiliary field, changes the bit level of the Rx/Tx packet field to "recessive", and thus generates a reception message packet. The generated reception message packet is temporarily stored in a buffer of the communication interface 31. The temporarily stored reception message packet is read and transmitted to the bus in a FIFO manner.

Next, a transmission process of a transmission message packet from a communication unit, a reception process of a reception message packet to a communication unit, and a reception and transmission process of a control unit will be described with reference to respective flow charts.

Figure 4:
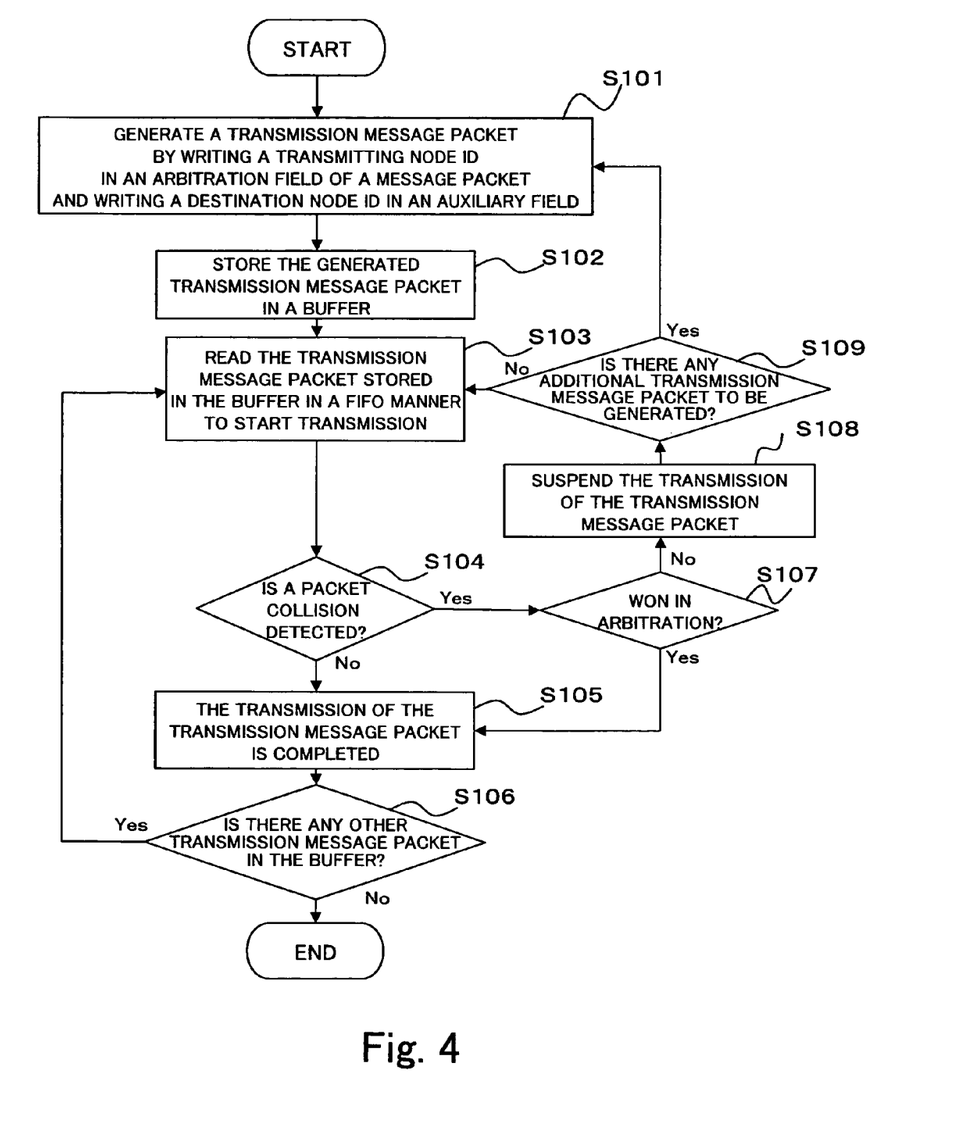
FIG. 4 is a flow chart showing a transmission process of a transmission message packet from a communication unit according to the preferred embodiment.

First, a transmission process by a communication unit will be described with reference to the flow chart of FIG. 4. The communication control section of a communication unit writes a transmitting node ID in the arbitration field of a message packet, writes a destination node ID in the auxiliary field, and thus generates a transmission message packet as shown in FIG. 2A (S101) The generated transmission message packet is temporarily stored in a buffer of the communication interface (S102). The transmission message packet stored in the buffer is read in a FIFO manner at predetermined intervals, and starts to be transmitted onto the bus (S103). During transmission of the transmission message packet, the communication control section monitors to detect a collision between packets on the bus (S104). If there is no packet collision, the transmission of the transmission message packet is continued and completed (S105). After the completion of the packet transmission, the communication control section verifies whether or not any other transmission message packet is present in the buffer (S106), and, if any other transmission message packet is still remaining, the process returns to step S103, where the communication control section attempts to transmit the remaining transmission message packet. At step S104, although arbitration fields of colliding transmission and reception message packets may indicate an identical node ID, the communication control section also refers to other fields, such as Rx/Tx packet fields, in which a transmission message packet and a reception message packet always have different contents, and a packet collision can therefore be easily and reliably detected.

Figure 5:
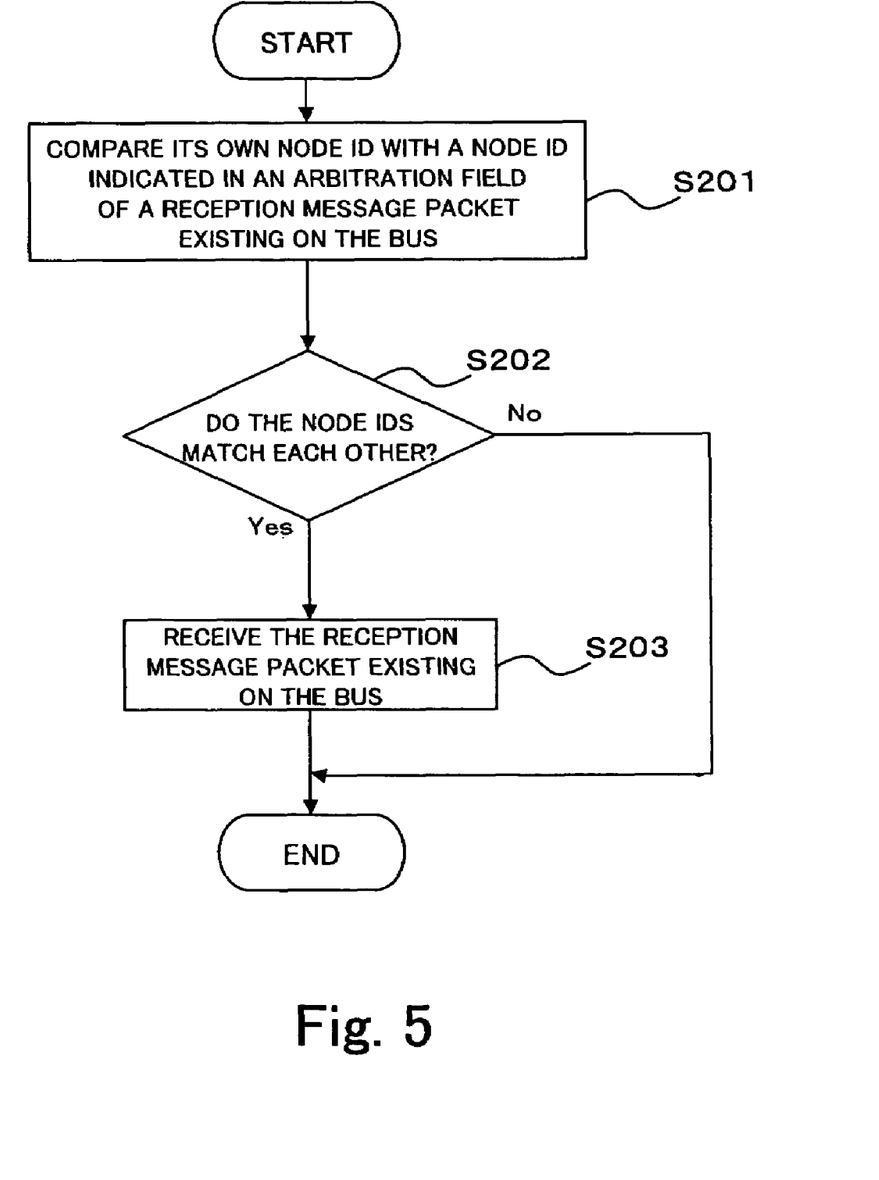
FIG. 5 is a flow chart showing a reception process of a reception message packet into a communication unit according to the preferred embodiment.

Referring next to FIG. 5, a reception process by a communication unit will be described.

When a reception message packet exists on the bus, the communication control section of a communication unit compares its own node ID with a node ID indicated in the arbitration field of the reception message packet existing on the bus (S201). If the node IDs match each other in this comparison (S202), the communication unit receives the reception message packet existing on the bus (S203). If the node IDs do not match, the communication unit does not receive the reception message packet, and terminates the process.

Figure 6:
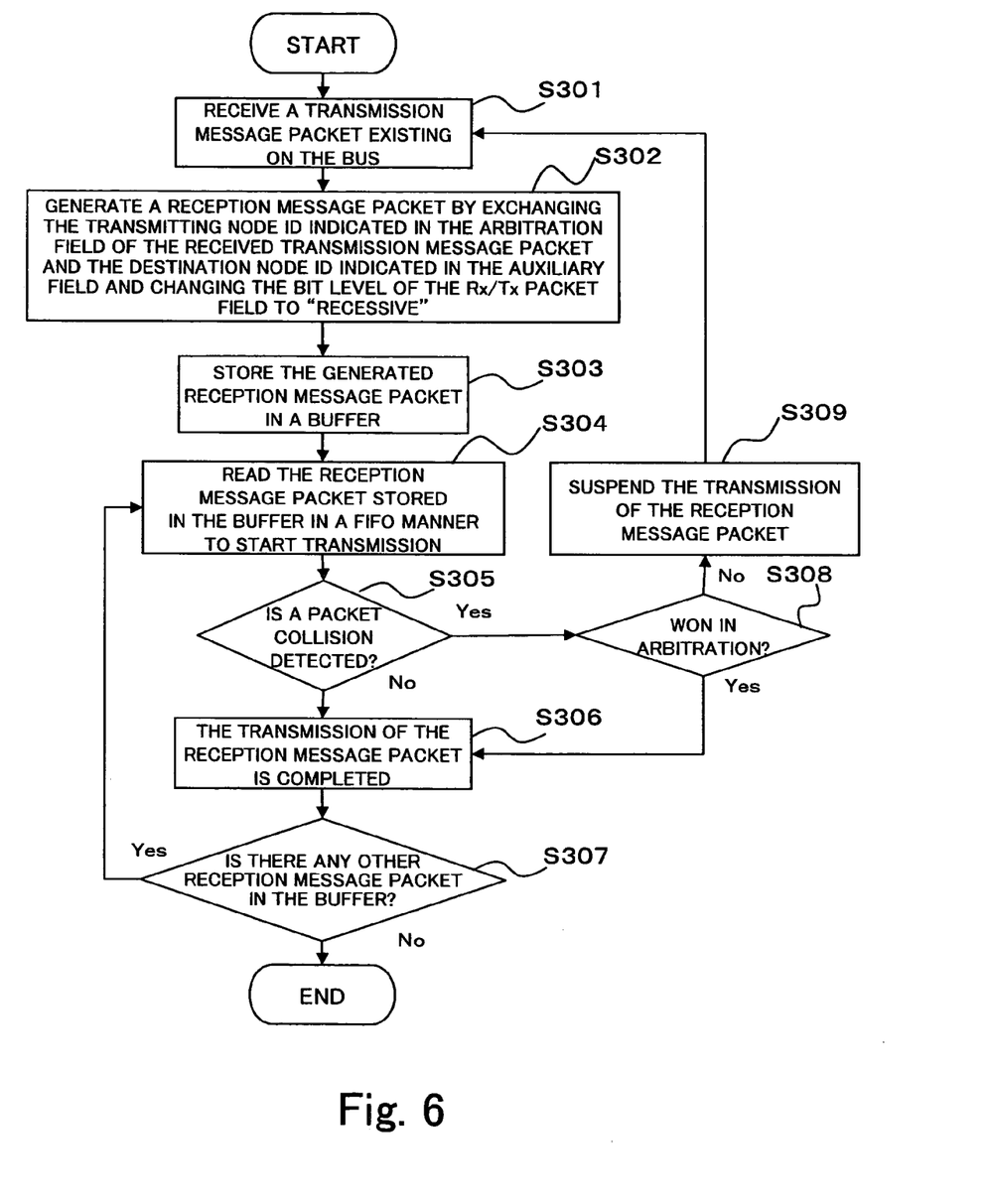
FIG. 6 is a flow chart showing a reception and transmission process of a message packet into and from the control unit according to the preferred embodiment.

Referring now to FIG. 6, a reception and transmission process by a control unit will be described. When the communication control section of a control unit detects a transmission message packet on the bus, the communication control section receives the transmission message packet through the communication interface (S301). Then, the communication control section exchanges the transmitting node ID indicated in the arbitration field of the received transmission message packet and the destination node ID indicated in the auxiliary field, changes the bit level of the Rx/Tx packet field to "recessive", and thus generates a reception message packet as shown in FIG. 2B (S302). The generated reception message packet is temporarily stored in the buffer of the communication interface (S303). The reception message packet stored in the buffer is read in a FIFO manner at predetermined intervals, and starts to be transmitted onto the bus (S304). During transmission of the reception message packet, the communication control section monitors to detect a collision between packets on the bus (S305). If there is no packet collision, the transmission of the reception message packet is continued and completed (S306). After the completion of the packet transmission, the communication control section verifies whether or not any other reception message packet is present in the buffer (S307), and, if any other reception message packet is still remaining, the process returns to step S304, where the communication control section attempts to transmit the remaining reception message packet.

At step S305, when a packet collision is detected during the transmission of the reception message packet, the communication control section performs an arbitration (S308). If the reception message packet wins in the arbitration, the communication control section continues to transmit the reception message packet (S306). On the other hand, if the reception message packet loses in the arbitration, the communication control section suspends the transmission of the reception message packet (S309), and begins again to receive a transmission message packet newly transmitted from a communication unit (S301). Subsequently, the communication control section repeatedly attempts to transmit a reception message packet until the buffer becomes empty of reception message packets.

As described above, even when a collision between packets occurs while the control unit is transmitting reception message packets, the reception message packets for which transmission is suspended are read and transmitted from the buffer in a FIFO manner upon completion of the reception step. As a result, because the control unit converts transmission message packets to generate reception message packets and transmits the generated reception message packets to the bus in an order in which the corresponding transmission message packets are received, according to the present embodiment, a message packet having a higher-priority transmitting node ID can reach a destination node ahead of other packets.

When priorities of message packets are determined based on priorities of transmitting node IDs, if a unit having a higher-priority node ID continuously transmits message packets to the bus, it is possible that a problem may arise such that another unit having a lower-priority node ID cannot transmit any message packet to the bus. In order to solve such a problem, each unit may be configured to delay transmission of a next message packet to the bus by a predetermined time interval after each time a message packet is transmitted to the bus. Specifically, while a unit having a higher-priority node ID delays transmission of a message packet, another unit having a lower-priority node ID can transmit a message packet to the bus. Therefore, it is possible to prevent a situation in which only message packets transmitted from a unit having a higher-priority node ID occupy the bus.

Next, a specific example using the bus communication standard of the present embodiment will be described referring to an imaging system.

Figure 7:
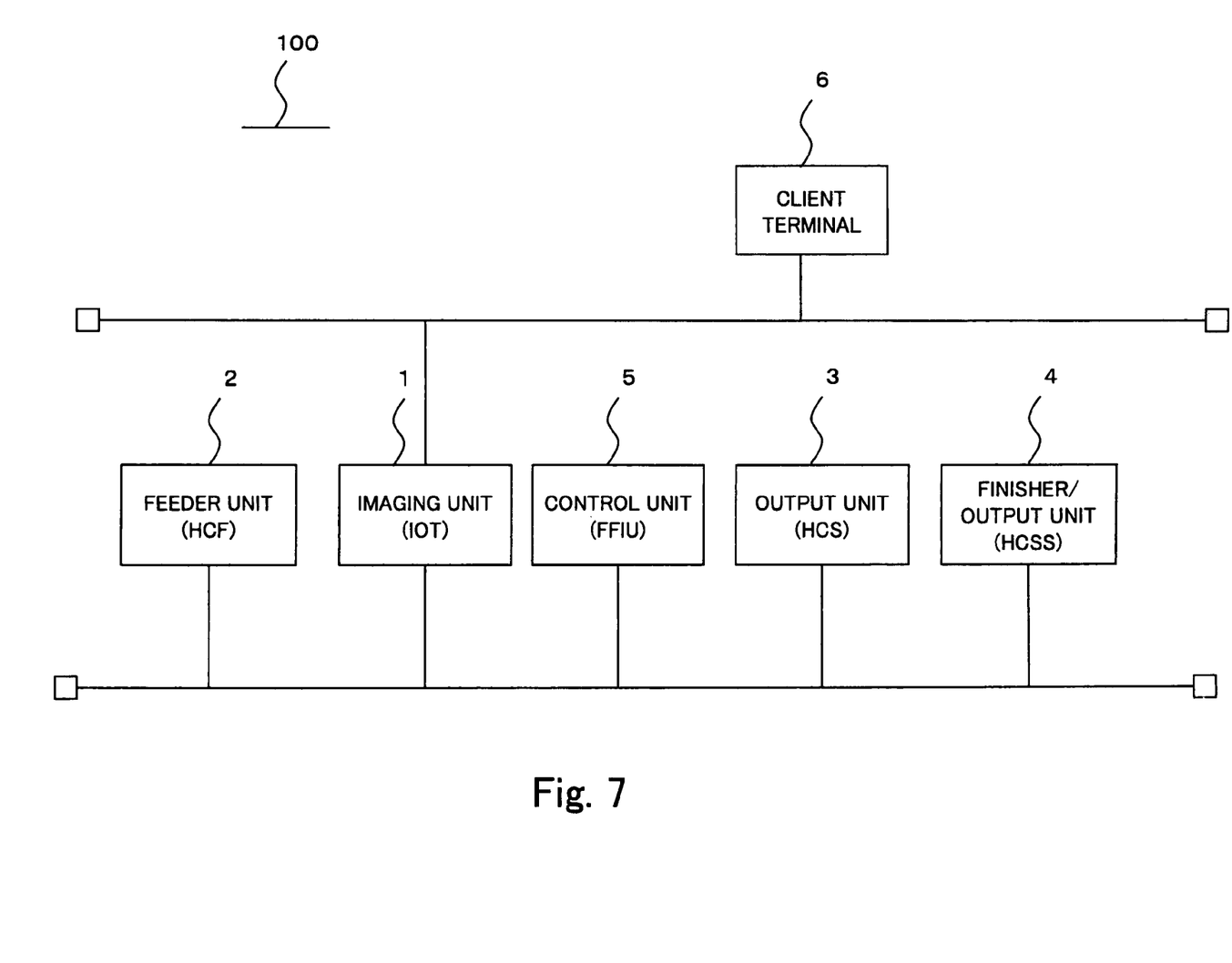
FIG. 7 shows a system structure of an imaging system according to the preferred embodiment.

FIG. 7 shows a system structure of an imaging system 100 that provides bus communication using the CAN standard according to the present embodiment. In the following description of the present embodiment, although an imaging system is described as a specific example, the present embodiment is not limited to such a configuration and may also be applied to any other system that employs a serial data bus standard.

The imaging system 100 includes bus-connected communication units, such as an imaging unit 1 (IOT, Image Output Terminal), a sheet feeder unit 2 (HCF, High Capacity Feeder), a sheet output unit 3 (HCS, High Capacity Stacker), and a finisher/output unit 4 (HCSS, High Capacity Stapler/Stacker). In addition, a control unit 5 (FFIU, Feeder and Finisher Interface Unit) is bus-connected between the imaging unit and other communication units, and controls bus communication between these units. Furthermore, a client terminal 6 is connected to the imaging unit through a network, such as Ethernet (registered trademark), and provides image data to the imaging unit. The imaging unit 1 may be any suitable imaging unit, including but not limited to a laser printer, an ink jet printer, a digital multifunction device, or a facsimile. Alternatively, instead of supplying image data directly to the imaging unit 1, the client terminal 6 can be configured to supply image data to the imaging unit 1 through a print server. In addition, an image input unit (IIT, Image Input Terminal) may be bus-connected and used to supply image data to the imaging unit 1.

In this system 100, the imaging unit 1 forms an image on a sheet of paper based on image data received from the client terminal 6 through the network, and/or forms an image on a sheet of paper based on image data read through the image input unit. The sheet feeder unit 2 is connected to an input side of the imaging unit 1, and is capable of feeding a large number of sheets of paper to the imaging unit 1. The sheet output unit 3 is connected to an output side of the imaging unit 1, and is capable of stacking a large number of output sheets of paper on which images are formed in the imaging unit 1. The finisher/output unit 4 performs a finishing process (such as, stapling) of output sheets of paper on which images are formed in the imaging unit 1, and outputs the finished sheets of paper.

Figure 8:
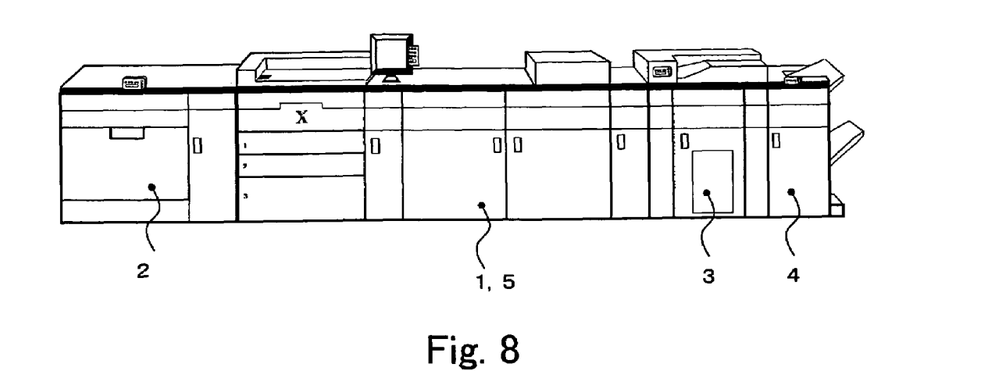
FIG. 8 shows an example of an external view of the imaging system wherein respective units are bus-connected according to the preferred embodiment.

FIG. 8 shows an example of an external view of bus-connected units in the imaging system 100.

As the imaging system 100, although the present embodiment as shown in FIG. 7 provides a system that includes the control unit 5 as a separate unit, the present invention is not limited to such a system. For example, the imaging unit may be configured to also function as the control unit.

Figure 9:
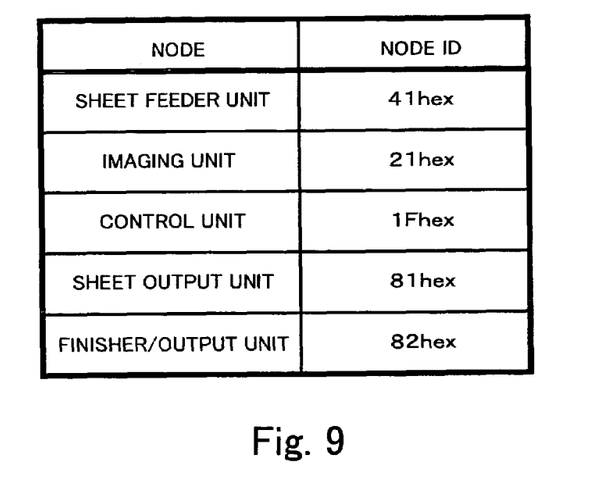
FIG. 9 shows a table of node IDs representing priorities of respective units in the imaging system according to the preferred embodiment.

After bus-connected communication units begin operating, the control unit 5 assigns predetermined unique node IDs to the respective communication units. As shown in a table of FIG. 9, a node ID with a smaller numerical value is assigned to a unit having a higher priority in the system. According to the present embodiment, an order of priorities is defined such that the control unit 5 has a node ID with the highest priority (1F in hex) and the finisher/output unit 4 has a node ID with the lowest priority (82 in hex).

The imaging unit 1 also functions as a master node which transmits highest-priority data in the system. For example, when an error affecting the entire system occurs, such as when an error is found in image data received from the client terminal, the imaging unit 1 transmits a forceful termination command message to all other units to forcefully terminate operation of the respective units. However, when such a high-priority message is transmitted to the bus in the related art CAN-based system, an order of priorities of packets is determined based on the destination node IDs, and may cause a problem as will be explained below.

In a case where the imaging unit 1 transmits to the finisher/output unit 4 a message packet A, such as a forceful termination command message, including important data that must be transmitted ahead of other messages in the system, and simultaneously the sheet output unit 3 transmits a message packet B to the imaging unit 1, these message packets collide on the bus and an arbitration is performed for these message packets. In the related art CAN-based system, the arbitration field of the packet A indicates a node ID of the finisher/output unit 4 as a destination node ID, that is, 82 in hex (82hex), and the arbitration field of the packet B indicates a node ID of the imaging unit 1 as a destination node ID, that is, 21 in hex (21hex). In this case, the packet B with 21hex is determined to have a higher priority than that of the packet A with 82hex, and flows through the bus ahead of the packet A having greater importance in the system.

As described above, while the imaging unit 1 having a node ID with the highest priority in the system transmits, for example, upon occurrence of a system error, a forceful termination command message to other units having node IDs with priorities lower than that of the imaging unit 1 to forcefully terminate current operation of the respective units, when another unit transmits another message to the imaging unit 1, in the related art CAN-based system, the message transmitted to the imaging unit from the other unit is erroneously allowed to flow ahead of the forceful termination command message. In contrast, according to the present embodiment, because the arbitration field of a message packet to be transmitted from each unit indicates a transmitting node ID, a message packet having a higher-priority transmitting node ID can reach a destination node ahead of other packets. Thus, the above-described problem as in the related art system can be overcome.

The present embodiment can be implemented, along with using a hardware structure similar to that of the related art CAN-based system, by simply modifying its software.

Optionally, both the related art CAN-based mode and the CAN-based mode of the present embodiment may be incorporated in respective units so that either mode can be selected as desired to operate the respective units. In such a structure, when the related art CAN-based mode is selected, each of the bus-connected units writes a destination node ID in the arbitration field of a packet message before transmission of the packet message. When the CAN-based mode of the present embodiment is selected, each unit writes a transmitting node ID in the arbitration field of a packet message to be transmitted. To allow such selection between the modes, a selector switch may be provided in each unit in order to select either mode by switching the selector switch as desired at the time when, for example, units are connected to construct a system. Alternatively, at the time when the control unit assigns node IDs to respective communication units, in addition to the node IDs, the control unit may transmit to the respective units information indicating the mode of operation so that each communication unit may set its own mode based on the transmitted mode information. When the related art CAN-based mode is selected, the control unit does not exchange a transmitting node ID and a destination node ID. As described above, by providing a mode selection unit for each communication unit, either the related art CAN-based mode or the CAN-based mode of the present embodiment can be used as desired. In addition, the system may be configured to obtain mode-setting information from respective communication units so that the coexisting communication units can be prevented from operating in different modes. However, both a communication unit operating in the related art CAN-based mode and a communication unit operating in the CAN-based mode of the present embodiment can coexist in a single system. In such a system, the control unit refers to, for example, the Rx/Tx packet field, and if a message packet is transmitted from a communication unit operating in the related art CAN-based mode, the control unit does not exchange a transmitting node ID and a destination node ID. As a result, an order of priorities in an arbitration between communication units can be flexibly determined based on a state of control of the units and an instruction transmitted from outside the units. For example, in some settings, a particular device can be selected to have a priority higher than those of all other communication units in both transmission and reception of packet messages.

In a communication system according to one aspect of the present invention, it is preferable that, after each time a node transmits a message packet to the bus, the node delays transmission of a next message packet to the bus by a predetermined time interval.

In such a communication system, while a node having a higher-priority node ID delays transmission of a message packet, another node having a lower-priority node ID can transmit a message packet to the bus. Therefore, it is possible to prevent a situation in which only message packets transmitted from a node having a higher-priority node ID occupy the bus.

According to another aspect of the present invention, there is provided a control unit that controls a flow of message packets through a bus, wherein a node ID uniquely defined for each of bus-connected nodes is indicated in an arbitration field of each message packet, the control unit comprising a receiving unit that receives a message packet in which one of the nodes has written a node ID of a transmitting node in the arbitration field and has written a node ID of a destination node in an auxiliary field defined at a predetermined location; a rewriting unit that rewrites the received message packet by replacing the node ID written in the arbitration field with the node ID written in the auxiliary field; and a transmitting unit that transmits the rewritten message packet to the bus.

Such a control unit rewrites a message packet transmitted from a node by replacing a node ID written in the arbitration field with a node ID written in the auxiliary field, and transmits the rewritten message packet to the bus. Therefore, a destination node can receive a message packet existing on the bus based on a match between its own node ID and the node ID indicated in the rewritten arbitration field.

According to still another aspect of the present invention, there is provided a CAN bus connected node, wherein, when the node detects presence of a colliding message packet while the node attempts to transmit a message packet to a bus, the node determines, based on a comparison between its own node ID and a node ID indicated in an arbitration field of the colliding message packet, whether or not the node continues to transmit its own message packet, the CAN bus connected node comprising a transmitting node ID writing unit that writes its own node ID as a transmitting node ID into an arbitration field of a message packet to be transmitted to the bus; a destination node ID writing unit that writes a node ID of a destination node into an auxiliary field defined at a predetermined location in the message packet; a transmitting unit that transmits to the bus the message packet in which the transmitting and destination node IDs are written; a determination unit that determines, based on a comparison between its own node ID and a node ID indicated in an arbitration field of a message packet existing on the bus, whether or not the message packet is to be received; and a receiving unit that receives the message packet if the determination unit determines that the message packet is to be received.

Such a CAN bus connected node writes its own node ID as a transmitting node ID into an arbitration field of a message packet to be transmitted to the bus, writes a node ID of a destination node into an auxiliary field defined at a predetermined location in the message packet, and transmits the message packet to the bus. Therefore, a message packet having a higher-priority transmitting node ID can be transmitted to the bus ahead of other message packets.

According to still another aspect of the present invention, it is preferable that the CAN bus connected node further comprise a mode selection unit that selects either a transmitting node ID writing mode, in which a node ID of a transmitting node is written into an arbitration field of a message packet to be transmitted, or a destination node ID writing mode, in which a node ID of a destination node is written into an arbitration field of a message packet to be transmitted, wherein, when the destination node ID writing mode is selected, the destination node ID writing unit writes a node ID of a destination node into the arbitration field.

In such a CAN bus connected node, because a mode selection unit selects either the destination node ID writing mode or the transmitting node ID writing mode, either of the related art CAN-based standard and the CAN-based standard of the present invention can be used as desired.

According to still another aspect of the present invention, there is provided a CAN bus communication method for use in a CAN bus system comprising a plurality of bus-connected nodes and a control unit that controls communication between the nodes, wherein one of the nodes performs the steps of writing its own node ID as a transmitting node ID into an arbitration field of a message packet to be transmitted to a bus; writing a node ID of a destination node into an auxiliary field defined at a predetermined location in the message packet; and transmitting to the bus the message packet in which the transmitting and destination node IDs are written, and wherein the control unit performs the steps of receiving the message packet transmitted from the node; rewriting the received message packet to generate a message packet in which the node ID written in the arbitration field is replaced with the node ID written in the auxiliary field; and transmitting the generated message packet to the bus.

In such a CAN bus communication method, a node writes its own node ID as a transmitting node ID into an arbitration field of a message packet to be transmitted to a bus, writes a node ID of a destination node into an auxiliary field defined at a predetermined location in the message packet, and transmits the message packet to the bus. Therefore, a message packet having a higher-priority transmitting node ID can be transmitted to the bus ahead of other message packets. Further, a control unit rewrites a message packet transmitted from a node by replacing a node ID written in the arbitration field with a node ID written in the auxiliary field, and transmits the rewritten message packet to the bus. Therefore, a destination node can receive a message packet existing on the bus based on a match between its own node ID and the node ID indicated in the arbitration field rewritten by the control unit.

The entire disclosure of Japanese Patent Application No. 2003-364289 filed on Oct. 24, 2003 including specification, claims, drawings, and abstract is incorporated herein by reference in its entirety.

The invention claim is:

1. A communication system, comprising a plurality of bus-connected nodes, each node having a unique node ID, wherein, when a collision occurs between message packets transmitted from the nodes, a message packet with an arbitration field indicating a node ID with a highest priority flows through a bus ahead of any other colliding message packet, wherein each of the nodes comprises:
   a transmitting node ID writing unit that writes its own node ID as a transmitting node ID into an arbitration field of a message packet to be transmitted to the bus;
   a destination node ID writing unit that writes a node ID of a destination node into an auxiliary field defined at a predetermined location in the message packet;
   a transmitting unit that transmits to the bus the message packet in which the transmitting and destination node IDs are written;
   a determination unit that determines, based on a comparison between its own node ID and a node ID indicated in an arbitration field of a message packet existing on the bus, whether or not the message packet is to be received; and
   a receiving unit that receives the message packet if the determination unit determines that the message packet is to be received, wherein the communication system further comprises a control unit comprising:
   a receiving unit that receives a message packet transmitted from one of the nodes;
   a rewriting unit that rewrites the received message packet by replacing the node ID written in the arbitration field with the node ID written in the auxiliary field; and
   a transmitting unit that transmits the rewritten message packet to the bus.

2. A communication system according to claim 1, wherein, after each time one of the nodes transmits a message packet to the bus, the node delays transmission of a next message packet to the bus by a predetermined time interval.

3. A communication system according to claim 1, wherein, when a message packet to be transmitted loses in an arbitration and transmission of the message packet is suspended, the control unit attempts again to transmit the message packet after a suspension period from the arbitration, wherein the suspension period from the arbitration is shorter than that of any other node.

4. A communication system, comprising a plurality of bus-connected nodes, each node having a unique node ID, wherein, when a collision occurs between message packets transmitted from the nodes, a message packet with an arbitration field indicating a node ID with a highest priority flows through a bus ahead of any other colliding message packet, wherein each of the nodes comprises:
   a communication control circuit that controls communication to and from the node; and
   a communication interface circuit that transmits and receives a message packet, wherein the communication control circuit of the node:
   writes its own node ID as a transmitting node ID into an arbitration field of a message packet to be transmitted to the bus;
   writes a node ID of a destination node into an auxiliary field defined at a predetermined location in the message packet;
   transmits through the communication interface circuit to the bus the message packet in which the transmitting and destination node IDs are written;
   determines, based on a comparison between its on node ID and a node ID indicated in an arbitration field of a message packet existing on the bus, whether or not the message packet is to be received; and
   receives through the communication interface circuit a message packet that is determined to be received, wherein the communication system further comprises a control unit comprising:
   a communication control circuit that controls communication to and from the control unit; and
   a communication interface circuit that transmits and receives a message packet, wherein the communication control circuit of the control unit:
   receives through the communication interface circuit a message packet transmitted from one of the nodes;
   rewrites the received message packet by replacing the node ID written in the arbitration field with the node ID written in the auxiliary field; and
   transmits the rewritten message packet through the communication interface circuit to the bus.

5. A control unit that controls a flow of message packets through a bus, wherein a node ID uniquely defined for each of bus-connected nodes is indicated in an arbitration field of each message packet, the control unit comprising:
   a receiving unit that receives a message packet in which one of the nodes has written a node ID of a transmitting node in the arbitration field and has written a node ID of a destination node in an auxiliary field defined at a predetermined location;
   a rewriting unit that rewrites the received message packet by replacing the node ID written in the arbitration field with the node ID written in the auxiliary field; and
   a transmitting unit that transmits the rewritten message packet to the bus.

6. A control unit that controls a flow of message packets through a bus, wherein a node ID uniquely defined for each of bus-connected nodes is indicated in an arbitration field of each message packet, the control unit comprising:

a communication control circuit that controls communication to and from the control unit; and a communication interface circuit that transmits and receives a message packet, wherein the communication control circuit:

receives through the communication interface circuit a message packet in which one of the nodes has written a node ID of a transmitting node in the arbitration field and has written a node ID of a destination node in an auxiliary field defined at a predetermined location;

rewrites the received message packet by replacing the node ID written in the arbitration field with the node ID written in the auxiliary field; and transmits the rewritten message packet through the communication interface circuit to the bus.

7. A CAN bus connected node, wherein, when the node detects presence of a colliding message packet while the node attempts to transmit a message packet to a bus, the node determines, based on a comparison between its own node ID and a node ID indicated in an arbitration field of the colliding message packet, whether or not the node continues to transmit its own message packet, the CAN bus connected node comprising:

a transmitting node ID writing unit that writes its own node ID as a transmitting node ID into an arbitration field of a message packet to be transmitted to the bus;

a destination node ID writing unit that writes a node ID of a destination node into an auxiliary field defined at a predetermined location in the message packet;

a transmitting unit that transmits to the bus the message packet in which the transmitting and destination node IDs are written;

a determination unit that determines, based on a comparison between its own node ID and a node ID indicated in an arbitration field of a message packet existing on the bus, whether or not the message packet is to be received; and a receiving unit that receives the message packet if the determination unit determines that the message packet is to be received.

8. A CAN bus connected node according to claim 7, wherein, after each time a message packet is transmitted to the bus, the transmitting unit delays transmission of a next message packet to the bus by a predetermined time interval.

9. A CAN bus connected node according to claim 7, the node further comprising:

a mode selection unit that selects either a transmitting node ID writing mode, in which a node ID of a transmitting node is written into an arbitration field of a message packet to be transmitted, or a destination node ID writing mode, in which a node ID of a destination node is written into an arbitration field of a message packet to be transmitted, wherein when the destination node ID writing mode is selected, the destination node ID writing unit writes a node ID of a destination node into the arbitration field.

10. A CAN bus connected node, comprising:

a communication control circuit that controls communication to and from the node; and a communication interface circuit that transmits and receives a message packet, wherein, when the communication control circuit detects presence of a colliding message packet while the node attempts to transmit a message packet through the communication interface circuit to a bus, the communication control circuit determines, based on a comparison between its own node ID and a node ID indicated in an arbitration field of the colliding message packet, whether or not the node continues to transmit its own message packet, wherein the communication control circuit:

writes its own node ID as a transmitting node ID into an arbitration field of a message packet to be transmitted to the bus;

writes a node ID of a destination node into an auxiliary field defined at a predetermined location in the message packet;

transmits through the communication interface circuit to the bus the message packet in which the transmitting and destination node IDs are written;

determines, based on a comparison between its own node ID and a node ID indicated in an arbitration field of a message packet existing on the bus, whether or not the message packet is to be received; and receives through the communication interface circuit a message packet that is determined to be received.

11. A CAN bus communication method for use in a CAN bus system comprising a plurality of bus-connected nodes and a control unit that controls communication between the nodes, wherein one of the nodes performs the steps of:

writing its own node ID as a transmitting node ID into an arbitration field of a message packet to be transmitted to a bus;

writing a node ID of a destination node into an auxiliary field defined at a predetermined location in the message packet; and transmitting to the bus the message packet in which the transmitting and destination node IDs are written, and wherein the control unit performs the steps of:

receiving the message packet transmitted from the node;

rewriting the received message packet to generate a message packet in which the node ID written in the arbitration field is replaced with the node ID written in the auxiliary field; and transmitting the generated message packet to the bus.

12. A storage medium readable by a computer, the storage medium storing a program of instructions executable by the computer to perform a function for controlling a control unit that controls a flow of message packets through a bus, wherein a node ID uniquely defined for each of bus-connected nodes is indicated in an arbitration field of each message packet, the function comprising the steps of:

receiving a message packet in which one of the nodes has written a node ID of a transmitting node in the arbitration field and has written a node ID of a destination node in an auxiliary field defined at a predetermined location;

rewriting the received message packet by replacing the node ID written in the arbitration field with the node ID written in the auxiliary field; and transmitting the rewritten message packet to the bus.

13. A storage medium readable by a computer, the storage medium storing a program of instructions executable by the computer to perform a function for controlling a CAN bus connected node, wherein, when the node detects presence of a colliding message packet while the node attempts to transmit a message packet to a bus, the node determines, based on a comparison between its own node ID and a node ID indicated in an arbitration field of the colliding message packet, whether or not the node continues to transmit its own message packet, the function comprising the steps of:

writing its own node ID as a transmitting node ID into an arbitration field of a message packet to be transmitted to the bus;

writing a node ID of a destination node into an auxiliary field defined at a predetermined location in the message packet;

transmitting to the bus the message packet in which the transmitting and destination node IDs are written;

determining, based on a comparison between its own node ID and a node ID indicated in an arbitration field of a message packet existing on the bus, whether or not the message packet is to be received; and receiving the message packet if the message packet is determined to be received.

* * * * *